United States Patent Office 2,991,303
Patented July 4, 1961

2,991,303
PREPARATION OF O-ACETYL-p-ALKOXY-PHENOL
William K. T. Gleim, Island Lake, Ill., assignor, by mesne assignments, to Universal Oil Products Company, Des Plaines, Ill., a corporation of Delaware
No Drawing. Filed Oct. 20, 1958, Ser. No. 768,049
7 Claims. (Cl. 260—479)

This invention relates to a method for preparing monoalkyl ethers of hydroquinone and more particularly to a method of preparing the monomethyl and monoethyl ethers of hydroquinone.

It is an object of this invention to provide a method for preparing the monoalkyl ethers of hydroquinone without the simultaneous obtention of the dialkyl ethers of hydroquinone.

A further object of this invention is to provide an improved method for the preparation of monoalkyl ethers of hydroquinone which may be used as intermediates in the preparation of oxidation inhibitors.

One embodiment of this invention is found in a process for the preparation of a monoalkyl ether of hydroquinone which comprises acetylating hydroquinone, treating the resultant O,O'-diacetylhydroquinone with a dialkyl ester of an inorganic acid, saponifying the resultant O-acetyl-p-alkoxyphenol, and recovering the desired monoalkyl ether of hydroquinone.

A further embodiment of this invention is found in a process for the preparation of a monoalkyl ether of hydroquinone which comprises refluxing hydroquinone with an excess of acetic anhydride, treating the resultant O,O'-diacetylhydroquinone with a dialkyl sulfate in acetone in the presence of potassium carbonate at a temperature in the range of from about 80° to about 125° C., saponifying the resultant O-acetyl-p-alkoxyphenol with caustic, and recovering the desired monoalkyl ether of hydroquinone.

A specific embodiment of the invention resides in a process for the preparation of the monomethyl ether of hydroquinone which comprises refluxing hydroquinone with an excess of acetic anhydride, treating the resultant O,O'-diacetylhydroquinone with dimethyl sulfate in acetone in the presence of potassium carbonate at a temperature in the range of from about 80° to about 125° C., saponifying the resultant O-acetyl-p-methoxyphenol with sodium hydroxide, and recovering the desired monomethyl ether of hydroquinone.

Other objects and embodiments referring to alternative dialkyl esters of inorganic acids will be found in the following further detailed description of the invention.

Heretofore some problems have arisen in preparing a monoalkyl ether of hydroquinone which is used as an intermediate in the preparation of compounds which are known to prevent the development of rancidity in edible oils and fats, one particular problem being due to the fact that some dialkyl ethers of hydroquinone will be present in the reaction mixture, thus necessitating an additional step of separating and removing the undesired dialkyl ethers. Examples of the type of compounds which will prevent the development of rancidity in edible oils and fats are 2-alkyl-4-alkoxyphenols such as 2-t-butyl-4-methoxyphenol, 2-t-amyl-4-methoxyphenol, etc. These inhibitors have been found to prevent the deterioration of edible fats and oils which may be of animal or vegetable origin such as linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats or oils and fats which have previously been subjected to various treatments such as blowing with air, heat treatment, etc.

The inhibitors of the type hereinbefore mentioned possess the desirable property of being carried over into bakery products after having been incorporated into the oil or fat. Many bakery products, as, for example, crackers, are kept for considerable periods of time in factories, stores or in the homes, before consumption. These bakery goods tend to become rancid due to the long period of storage. While some of the known inhibitors are very potent when used in edible fats and oils they do not possess the important property of being carried over into the bakery goods and therefore are not entirely satisfactory for the purposes intended. In addition many inhibitors are unsuitable because they are either toxic and therefore cannot be used for stabilizing the edible fats and oils or else they impart bad odors and taste to such compounds. In addition some of these compounds are so volatile that they are removed from the fats and oils during cooking or in deep fat frying, while others are relatively insoluble in oils and fats.

As hereinbefore stated compounds or inhibitors of the type comprising 2-alkyl-4-alkoxyphenols have been found to possess all the desirable properties and none of the undesirable properties attendant to their use as inhibitors for the oxidative deterioration of edible fats and oils. A particularly convenient method of preparing these compounds is to alkylate a monoalkyl ether of hydroquinone with an olefin-acting substance such as an olefin, an alcohol, an ether, etc. Therefore, it is important that the starting material comprising the monoalkyl ether of hydroquinone be prepared in a manner which will result in the obtention of a pure product, that is, one that is not in admixture with other products such as a dialkyl ether of hydroquinone. This has the effect of lowering the cost of the finished product due to the use of relatively more inexpensive equipment.

The desired product of the process of this invention, that is, a monalkyl ether of hydroquinone, is prepared by acetylating hydroquinone in the first stage of the reaction. This acetylating step is effected by refluxing hydroquinone with an excess of acetic anhydride at a temperature of approximately 140° C. to form the O,O'-diacetylhydroquinone. The latter compound is then treated with a dialkyl ester of in inorganic acid such as dimethyl sulfate, diethyl sulfate, dimethyl carbonate, diethyl carbonate, trimethyl phosphate, triethyl phosphate, etc., in the presence of a basic or alkaline compound such as potassium carbonate, sodium carbonate, lithium carbonate, calcium carbonate, potassium acetate, sodium acetate, lithium acetate, calcium acetate, potassium borate, sodium borate, lithium borate, calcium borate, potassium oxalate, sodium oxalate, lithium oxalate, calcium oxalate, etc. This step of the process is effected under anhydrous conditions in the presence of a substantially inert organic solvent, such solvents including aromatic hydrocarbons such as benzene, toluene, o-xylene, m-xylene, p-xylene, ethyl benzene, etc., paraffinic hydrocarbons such as n-pentane, n-hexane, n-heptane, etc.; cycloparaffinic hydrocarbons such as cyclopentane, cyclohexane, methylcyclopentane, methylcyclohexane, etc., alcohols such as methyl alcohol, ethyl alcohol, propyl alcohol, etc.; ethers such as dimethyl ether, diethyl ether, dipropyl ether, etc.; acetone, dioxane, etc. The compound which results from this treatment will comprise an O-acetyl-p-alkoxyphenol, with no dialkoxy benzenes being present, thus omitting the necessity of effecting a separation of the monoalkyl ethers and dialkyl ethers of hydroquinone before saponifying the aforesaid phenol. The O-acetyl-p-alkoxyphenol is then readily saponified by conventional means such as treatment with a caustic substance, examples of which are sodium hydroxide or potassium hydroxide to form the desired monoalkyl ether of hydroquinone.

The process of this invention may be effected in any suitable manner and may comprise either a batch or a continuous type operation. For example, when a batch type operation is used, a quantity of hydroquinone is placed in an appropriate apparatus along with an excess of acetic anhydride, said apparatus being provided with heating and refluxing means. The flask and contents thereof are heated to a temperature of approximately 140° C. and maintained thereat for a predetermined period of time after which the flask and contents thereof are cooled to room temperature and the acetylated hydroquinone is separated by conventional means such as fractional distillation from unreacted starting materials. The O,O'-diacetylhydroquinone along with the dialkyl ester of the inorganic acid, a solvent and the catalyst comprising an alkaline material such as potassium carbonate are placed in an appropriate apparatus such as a rotating autoclave.

The autoclave is sealed and heated to a temperature ranging from about 80° to about 200° C. and maintained thereat for a predetermined period of time. At the end of this residence time the autoclave and contents thereof are cooled to room temperature, the reaction mixture is filtered from the inorganic material, the solvent is evaporated and the residue is subjected to fractional distillation under reduced pressure. The O-acetyl-p-alkoxyphenol is recovered and placed in yet another appropriate apparatus along with the saponification agent such as sodium hydroxide. After saponifying the O-acetyl-p-alkoxyphenol the desired reaction product comprising the monoalkyl ether of hydroquinone is separated from unreacted starting materials and recovered by conventional means.

The process of this invention may also be effected in a continuous type operation. In this type of operation the starting materials comprising the hydroquinone and the acetylating agent such as acetic anhydride are continuously charged to a reactor which is maintained at the proper operating conditions of temperature and pressure. The reactor may comprise an unpacked vessel or coil or may be lined with an adsorbent packing material such as dehydrated bauxite, fire brick, alumina and the like. Upon completion of the desired residence time the O,O'-diacetylhydroquinone is continuously withdrawn, separated from the reactor effluent and charged to a second reactor, the effluent being recycled to form a portion of the feed stock. The other starting materials for the second step of the reaction, namely, the dialkyl ester of the inorganic acid, the alkaline material and the solvent are also continuously charged to the second reactor through separate lines or, if so desired, the solvent may be admixed with one or more of the starting materials for said second reaction and charged thereto in a single stream. This second reactor, like the first and also like the reactor which is used for the subsequent saponification reaction, is also maintained at predetermined operating conditions of temperature and pressure. The desired reaction product comprising the O-acetyl-p-alkoxyphenol is continuously withdrawn from the second reactor, separated from the reactor effluent and charged to a third reactor where said phenol is saponified by reaction with a caustic material such as sodium hydroxide or potassium hydroxide which is also continuously charged thereto. The desired reaction product comprising the monoalkyl ether of hydroquinone is continuously withdrawn, separated from unreacted starting materials and recovered by conventional means hereinbefore set forth.

The following examples are given to illustrate the process of the present invention, which, however, are not intended to limit the generally broad scope of the present invention in strict accordance therewith.

*Example I*

Hydroquinone was acetylated by refluxing 110 g. of hydroquinone with 250 cc. of acetic anhydride in an apparatus provided with heating and refluxing means at a temperature of about 140° C. for a period of about 2 hours. At the end of this time the O,O'-diacetylhydroquinone was separated and recovered. A mixture of 50 g. of O,O'-diacetylhydroquinone, 50 g. of potassium carbonate, 40 g. of dimethyl sulfate and 200 g. of acetone were placed in the glass liner of a rotating autoclave. The autoclave was flushed with nitrogen and the glass liner sealed therein. The autoclave was then heated to a temperature of about 100° C. and maintained thereat for a period of about 6 hours. At the end of this time the autoclave and contents thereof were cooled to room temperature and the reaction mixture was recovered by filtration from the inorganic material. The acetone was evaporated by placing said reaction mixture on a steam bath after which the residue was subjected to fractional distillation at reduced pressure. The cut boiling at 103–105° C. at 0.5 mm. pressure comprising O-acetyl-p-methoxyphenol was separated and recovered. This fraction was subjected to infra-red analysis where it was found that the cut consisted entirely of the desired O-acetyl-p-methoxyphenol with none of the dimethoxybenzene being present. The O-acetyl-p-methoxyphenol is saponified by treating said phenol with sodium hydroxide at a temperature of approximately 100° C. for a period of about 0.5 hours, the desired monomethyl ether of hydroquinone being separated and recovered by fractional distillation.

*Example II*

O,O'-diacetylhydroquinone is prepared in a manner similar to that set forth in Example I above. Following this a mixture of 50 g. of the diacetylhydroquinone, 50 g. of potassium carbonate, 40 g. of diethyl sulfate and 200 g. of acetone are placed in the glass liner of a rotating autoclave which is thereafter sealed and heated to a temperature of about 100° C. for a period of about 6 hours. At the end of this time the reaction mixture is filtered from the inorganic material and the solvent comprising acetone is evaporated by heating on a steam bath. The residue is subjected to fractional distillation and the desired O-acetyl-p-ethoxyphenol is separated and recovered.

The aforesaid O-acetyl-p-ethoxyphenol is saponified by treating said compound with sodium hydroxide at a temperature of about 100° C. for a period of about 0.5 hours, at the end of which time the desired reaction product comprising the monomethyl ether of hydroquinone is separated and recovered by fractional distillation.

I claim as my invention:

1. A process for the preparation of O-acetyl-p-alkoxyphenol which comprises reacting O,O'-diacetyl hydroquinone under anhydrous conditions with a dialkyl ester of an inorganic acid in which the alkyl groups each contain from 1 to 2 carbon atoms and said acid being selected from the group consisting of sulfuric, carbonic and phosphoric acids, and recovering the resultant O-acetyl-p-alkoxyphenol.

2. A process for the preparation of O-acetyl-p-alkoxyphenol which comprises reacting O,O'-diacetyl hydroquinone under anhydrous conditions with a dialkyl sulfate in which the alkyl groups each contain from 1 to 2 carbon atoms, and recovering the resultant O-acetyl-p-alkoxyphenol.

3. A process for the preparation of O-acetyl-p-alkoxyphenol which comprises reacting O,O'-diacetyl hydroquinone under anhydrous conditions with a dialkyl sulfate in acetone in the presence of an alkaline compound at an elevated temperature, the alkyl groups of said sulfate each containing from 1 to 2 carbon atoms, and recovering the resultant O-acetyl-p-alkoxyphenol.

4. A process for the preparation of O-acetyl-p-alkoxyphenol which comprises reacting O,O'-diacetyl hydroquinone under anhydrous conditions with a dialkyl sulfate in acetone in the presence of potassium carbonate at a temperature in the range of from about 80° to about 200° C., the alkyl groups of said sulfate each containing from 1 to 2 carbon atoms, and recovering the resultant O-acetyl-p-alkoxyphenol.

5. A process for the preparation of O-acetyl-p-alkoxyphenol which comprises reacting O,O'-diacetyl hydroquinone under anhydrous conditions with a dialkyl sulfate in acetone in the presence of sodium carbonate at a temperature in the range of from about 80° to about 200° C., the alkyl groups of said sulfate each containing from 1 to 2 carbon atoms, and recovering the resultant O-acetyl-p-alkoxyphenol.

6. A process for the preparation of O-acetyl-p-methoxy-phenol which comprises reacting O,O'-diacetyl hydroquinone under anhydrous conditions with dimethyl sulfate in acetone in the presence of potassium carbonate at a temperature in the range of from about 80° to about 125° C., and recovering the resultant O-acetyl-p-methoxyphenol.

7. A process for the preparation of O-acetyl-p-ethoxyphenol which comprises reacting O,O'-diacetyl hydroquinone under anhydrous conditions with diethyl sulfate in acetone in the presence of potassium carbonate at a temperature in the range of from about 80° to about 125° C., and recovering the resultant O-acetyl-p-ethoxyphenol.

References Cited in the file of this patent

UNITED STATES PATENTS

| 2,212,532 | Werder | Aug. 27, 1940 |
| 2,668,861 | Geissman | Feb. 9, 1954 |

OTHER REFERENCES

Shaw: Jour. Chem. Soc. (London), vol. 99 (1911) pp. 1610.